United States Patent
Ise et al.

(10) Patent No.: US 9,179,090 B2
(45) Date of Patent: Nov. 3, 2015

(54) MOVING IMAGE RECORDING DEVICE, CONTROL METHOD THEREFOR, AND NON-TRANSITORY COMPUTER READABLE STORAGE MEDIUM

(71) Applicant: CANON KABUSHIKI KAISHA, Tokyo (JP)

(72) Inventors: Toshimichi Ise, Yokohama (JP); Shuichiro Matsushima, Tokyo (JP)

(73) Assignee: CANON KABUSHIKI KAISHA, Tokyo (JP)

( * ) Notice: Subject to any disclaimer, the term of this patent is extended or adjusted under 35 U.S.C. 154(b) by 207 days.

(21) Appl. No.: 13/766,060

(22) Filed: Feb. 13, 2013

(65) Prior Publication Data

US 2013/0209069 A1 Aug. 15, 2013

(30) Foreign Application Priority Data

Feb. 13, 2012 (JP) .................................. 2012-028858

(51) Int. Cl.
| | |
|---|---|
| *H04N 5/77* | (2006.01) |
| *H04N 9/80* | (2006.01) |
| *H04N 5/91* | (2006.01) |
| *H04N 9/82* | (2006.01) |

(52) U.S. Cl.
CPC .................. *H04N 5/91* (2013.01); *H04N 5/772* (2013.01); *H04N 9/8227* (2013.01)

(58) Field of Classification Search
USPC .................................. 386/224–227, 248, 241
See application file for complete search history.

(56) References Cited

U.S. PATENT DOCUMENTS

| 8,441,514 B2* | 5/2013 | Won et al. ................... 348/14.02 |
| 2004/0046749 A1* | 3/2004 | Ikeda ............................. 345/173 |
| 2004/0145660 A1* | 7/2004 | Kusaka ....................... 348/211.2 |
| 2009/0160732 A1* | 6/2009 | Kimura .......................... 345/1.1 |
| 2010/0053342 A1* | 3/2010 | Hwang et al. ............. 348/207.99 |
| 2010/0130250 A1* | 5/2010 | Choi ........................... 455/556.1 |
| 2011/0032388 A1* | 2/2011 | Manico et al. ........... 348/231.99 |

FOREIGN PATENT DOCUMENTS

| CN | 101196914 A | 6/2008 |
| JP | H1028250 A | 1/1998 |
| JP | 2007-266655 A | 10/2007 |

OTHER PUBLICATIONS

Chinese Office Action issued in corresponding Application No. 201310048277 on Aug. 3, 3015.
Japanese Office Action issued in corresponding Application No. 2012028858 on Sep. 7, 2015.

* cited by examiner

*Primary Examiner* — Nigar Chowdhury

(74) *Attorney, Agent, or Firm* — Carter, DeLuca, Farrell & Schmidt, LLP

(57) ABSTRACT

A moving image recording device comprising, an item superimposition unit configured to superimpose a superimposition item over a moving image in accordance with an input from a user, a storage control unit configured to cause a storage unit to store the moving image together with the superimposition item; and a control unit configured to control the storage unit to store information of an image over which the superimposition item has been superimposed in association with the moving image so that the image over which the superimposition item has been superimposed is used as a representative image of the moving image based on a change in a superimposed state of the superimposition item superimposed over the moving image by the item superimposition unit.

21 Claims, 11 Drawing Sheets

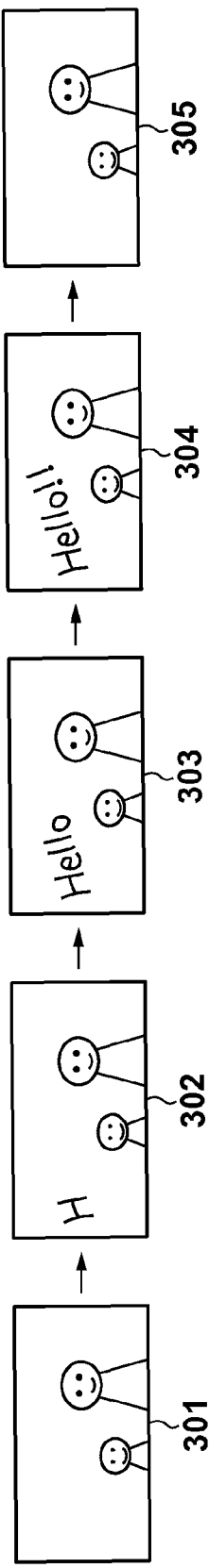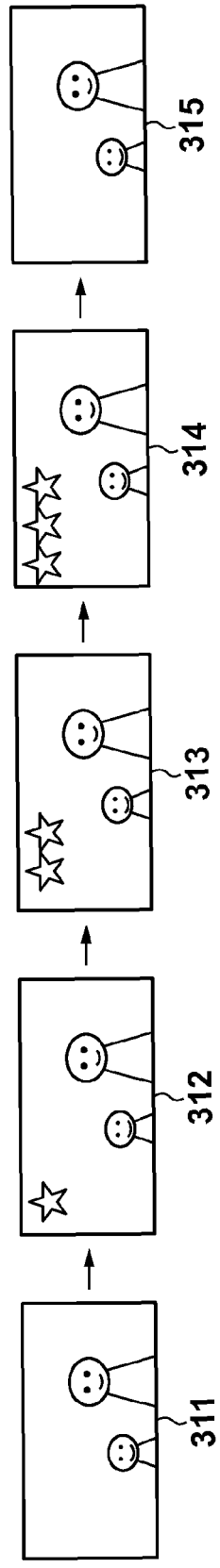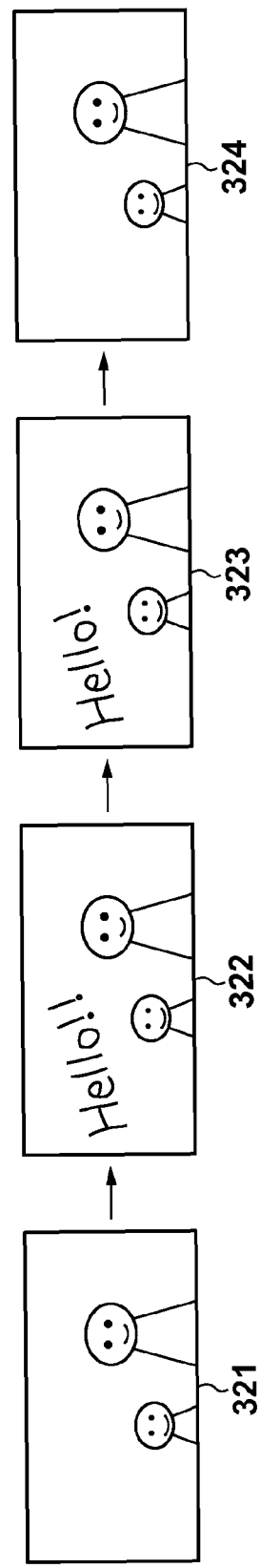

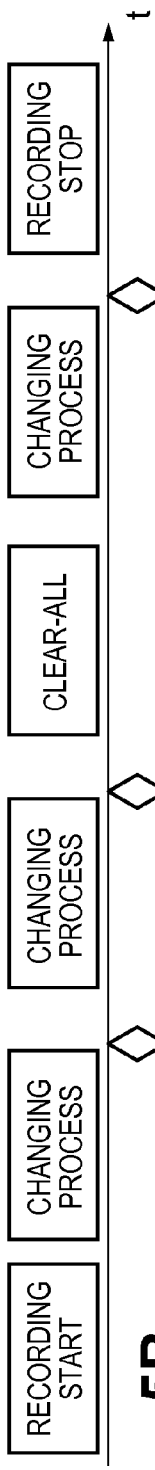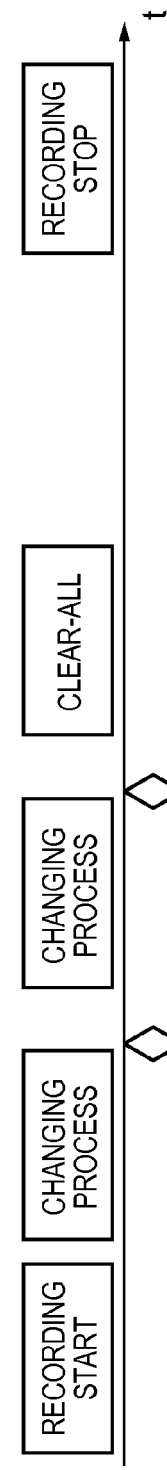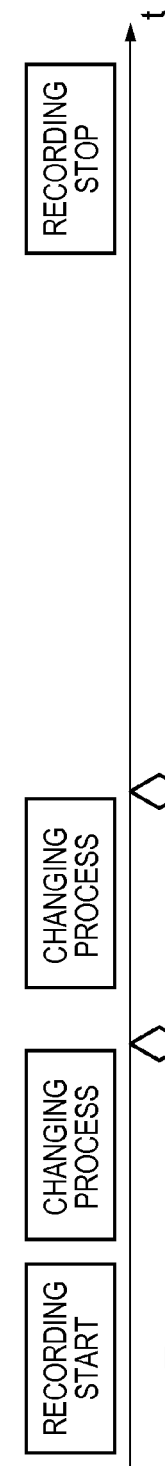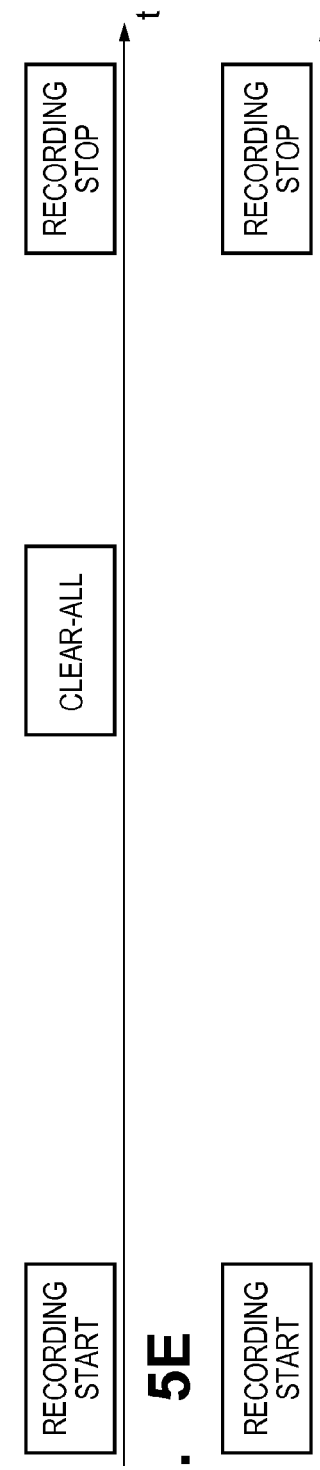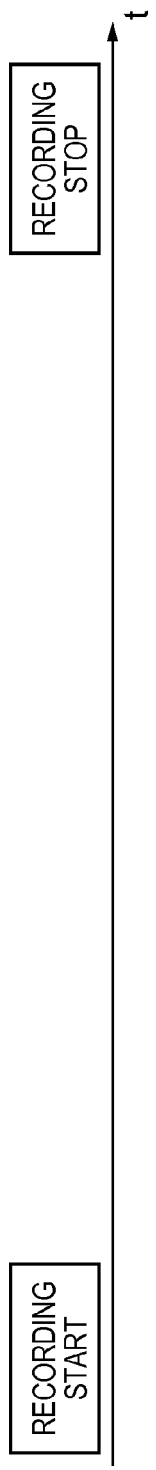

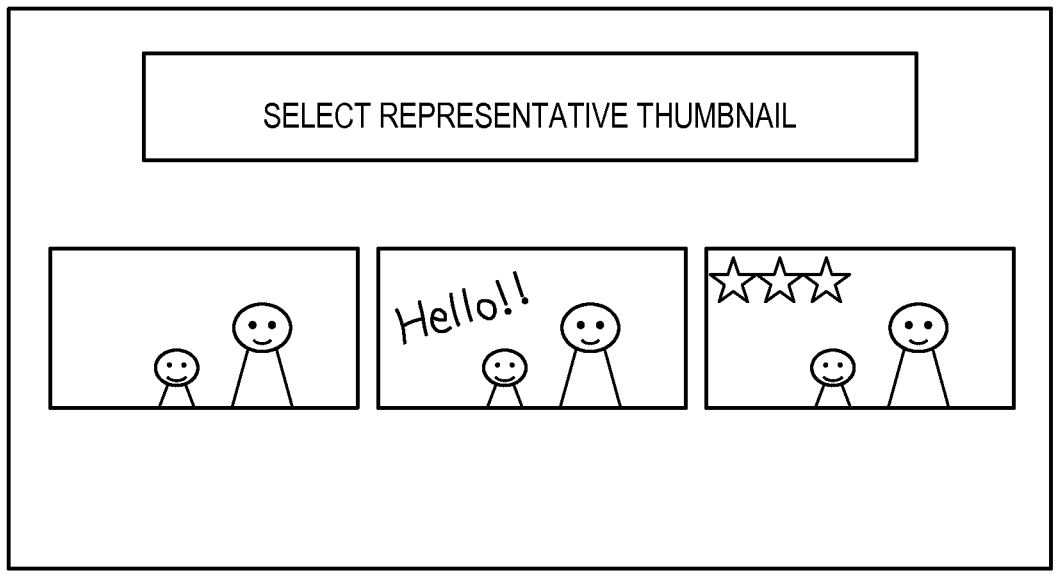
F I G. 7

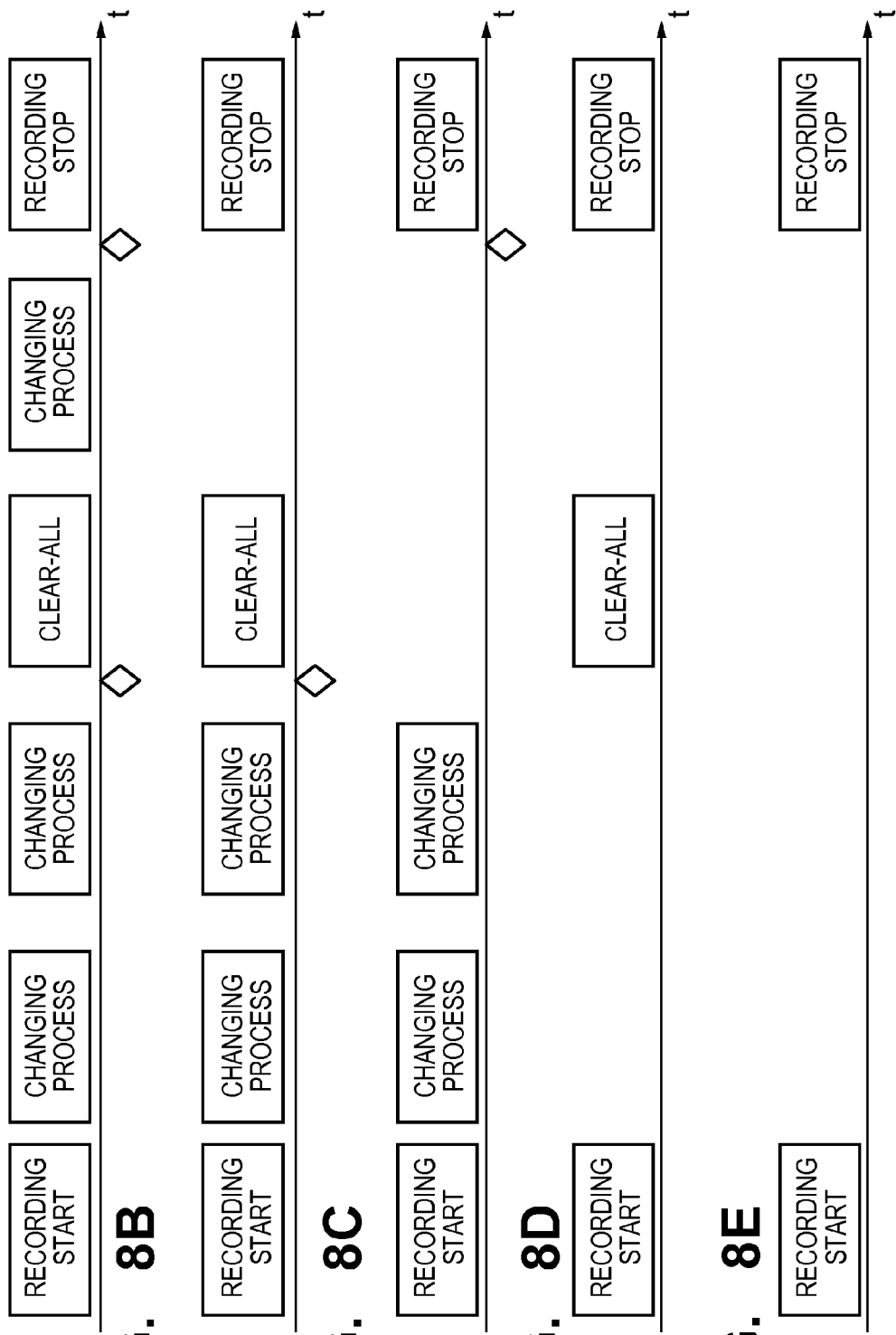

MOVING IMAGE RECORDING DEVICE, CONTROL METHOD THEREFOR, AND NON-TRANSITORY COMPUTER READABLE STORAGE MEDIUM

BACKGROUND OF THE INVENTION

1. Field of the Invention

The present invention relates to a moving image recording device, a control method therefor, and a non-transitory computer readable storage medium.

2. Description of the Related Art

Information devices equipped with touchscreens that enable intuitive operations have become widespread, and the functions that make use of the features of touchscreens have been increasing in number. Imaging devices such as video cameras and digital cameras have, for example, a hand-drawn input function that allows superimposing texts and graphics over an image through freehand input.

In order to make it easy to search for captured images, many imaging devices have a mode for displaying a list of thumbnails as representative images of a moving image. In general, out of frame images included in a moving image, a frame image at a certain timing is displayed as a thumbnail of the moving image. Japanese Patent Laid-Open No. 2007-266655 discloses a method for displaying a thumbnail desirable for a user. According to this method, while taking a moving image, when the angle of view is fixed for a predetermined time period or longer after zoom-in or when a predetermined time period has elapsed since focus lock, a corresponding frame image is used as a thumbnail, namely a representative image.

SUMMARY OF THE INVENTION

In the aforementioned conventional example, a timing for generating a thumbnail is determined in accordance with conditions of camera settings. Therefore, even if superimposition items such as texts and graphics are superimposed over an image while taking a moving image, there is no guarantee that a frame image in that state is extracted as a representative image.

In view of this, the present invention provides a technique whereby a frame image in the state where a superimposition item is superimposed over a moving image is used as a representative image.

One aspect of embodiments of the invention relates to a moving image recording device comprising, an item superimposition unit configured to superimpose a superimposition item over a moving image in accordance with an input from a user, a storage control unit configured to cause a storage unit to store the moving image together with the superimposition item; and a control unit configured to control the storage unit to store information of an image over which the superimposition item has been superimposed in association with the moving image so that the image over which the superimposition item has been superimposed is used as a representative image of the moving image based on a change in a superimposed state of the superimposition item superimposed over the moving image by the item superimposition unit.

Another aspect of embodiments of the invention relates to a control method for a moving image recording device comprising an item superimposition step of superimposing a superimposition item over a moving image in accordance with an input from a user, a storage control step of causing a storage unit to store the moving image together with the superimposition item, and a control step of controlling the storage unit to store information of an image over which the superimposition item has been superimposed in association with the moving image so that the image over which the superimposition item has been superimposed is used as a representative image of the moving image based on a change in a superimposed state of the superimposition item superimposed over the moving image by the item superimposition step.

Further features of the present invention will become apparent from the following description of exemplary embodiments (with reference to the attached drawings).

BRIEF DESCRIPTION OF THE DRAWINGS

FIGS. 3A to 3C show exemplary transitions in displayed screens according to an embodiment of the invention.

FIGS. 5A to 5E show examples of thumbnail generation timings according to First Embodiment of the invention.

FIG. 7 shows one example of a representative thumbnail selection screen according to Second Embodiment of the invention.

FIGS. 8A to 8E show examples of thumbnail generation timings according to Second Embodiment of the invention.

DESCRIPTION OF THE EMBODIMENTS

The following is a specific description of embodiments of the present invention. To begin with, the idea of the invention of the present application is explained.

<Idea of Invention of Present Application>

When a user superimposes a superimposition item over a moving image on an information device or an imaging device equipped with a touchscreen, there is a possibility that a frame image in this superimposed state is a representative image that makes the strongest impression on the user from the moving image. Therefore, if a frame image in the state where a superimposition item is superimposed over a moving image is used as a representative image, namely a thumbnail image of the moving image, then the distinguishability of the moving image can be significantly increased and the usability is greatly improved. In order to achieve this goal, the invention of the present application has arrived at the idea of generating a thumbnail based on changes in the state where a superimposition item is superimposed over an image. In this way, the invention of the present application enables generation of a thumbnail image desirable for a user.

The following describes a specific method for generating a thumbnail image step by step with reference to the drawings.

First Embodiment

Figure 1A:
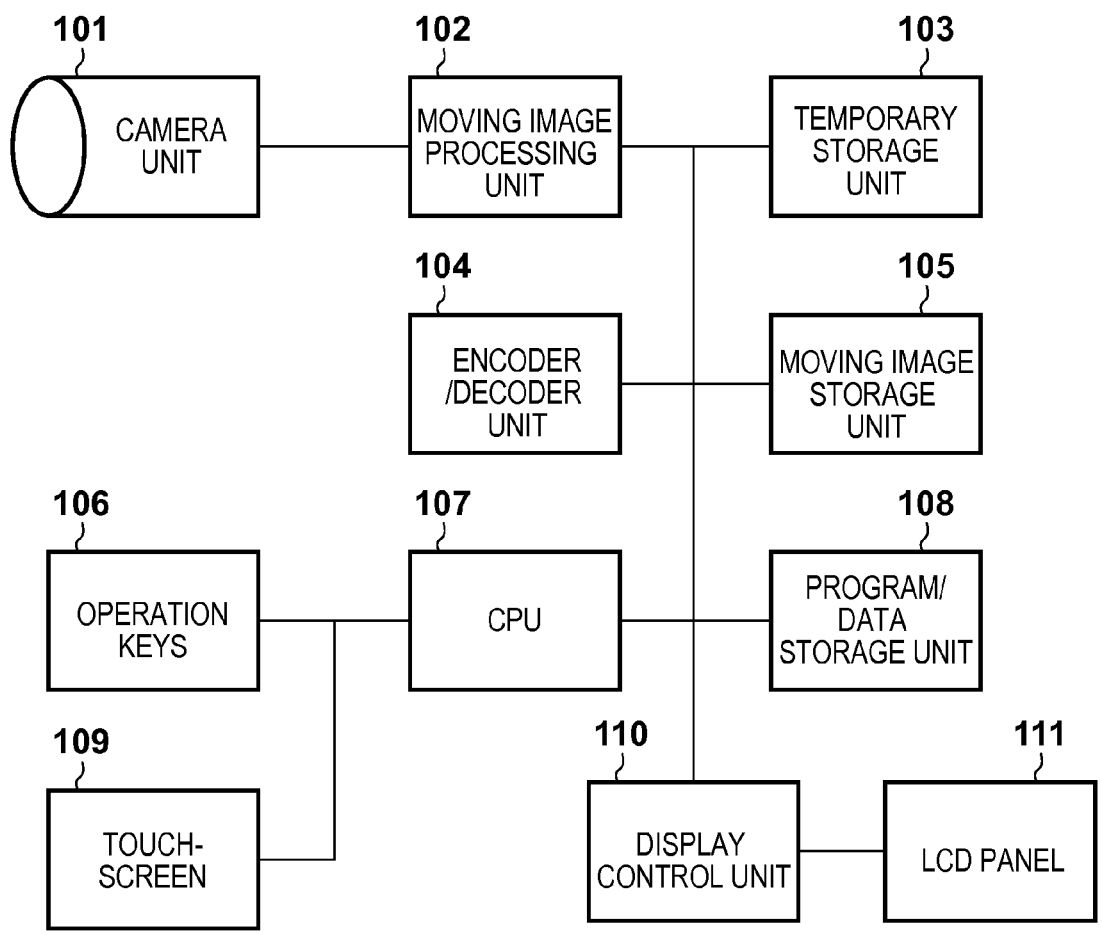
FIG. 1A is a block diagram showing a moving image recording device according to an embodiment of the invention.

FIG. 1A is a block diagram showing a datapath in a moving image recording device according to an embodiment of the present invention. In the present embodiment, a digital video camera is described as one example of the moving image recording device.

The moving image recording device according to the present embodiment has "hand-drawn input mode" that allows superimposing graphics and texts drawn by a user over a recorded moving image. There are various types of hand-drawn input, such as a pen, a stamp, an eraser, and animation. In this moving image recording device, a CPU 107 is a processing device that reads programs from a program/data storage unit 108 and controls the operations of the entire video camera in accordance with the read programs. The read programs have functions of causing the CPU 107 to execute a plurality of tasks in parallel. More specifically, under control of the CPU 107, "mode control task", "camera control task", "recorder control task", and "display control task" are executed. The CPU 107, which executes the display control task, functions as a display control unit. A part of a temporary storage unit 103 functions as a work area for the CPU 107 and provides a moving image frame buffer and an on-screen display (OSD) frame buffer which will be described later.

A camera unit 101 has a mechanism to input analog video signals to the video recording device. More specifically, the camera unit 101 includes a lens for focusing light from an object, an image sensor that photoelectrically converts an image of the object focused by the lens, a circuit that drives the image sensor, and the like. A moving image processing unit 102 converts analog video signals input from the camera unit 101 into digital moving image data and performs correction based on predetermined image processing, such as noise removal. The operations of the camera unit 101 and the moving image processing unit 102 are controlled by the "camera control task" executed by the CPU 107.

An encoder/decoder unit 104 encodes moving image data from the moving image processing unit 102. The moving image data encoded by the encoder/decoder unit 104 is first stored in the temporary storage unit 103 temporarily, and then stored in a moving image storage unit 105 together with associated management data. Conversely, upon playback of the moving image, the encoded moving image data (image data) read from the moving image storage unit 105 is decoded by the encoder/decoder unit 104 by way of the temporary storage unit 103. Thereafter, the moving image data is deployed to the moving image frame buffer in the temporary storage unit 103 again. The encoder/decoder unit 104 and the storage control performed by the moving image storage unit 105 are controlled by the "recorder control task" executed by the CPU 107.

The management data read from the moving image storage unit 105 is used in generating OSD data, that is, data for displaying texts superimposed over a captured image or an image being played back, or for a graphical user interface (GUI). The generated OSD data is rendered in the OSD frame buffer in the temporary storage unit 103. Data in the moving image frame buffer and the OSD frame buffer is superimposed by the display control unit 110 and displayed on an LCD panel 111. Operation keys 106 and a touchscreen 109 are both operation units that receive operational instructions from the user.

Figure 1B:
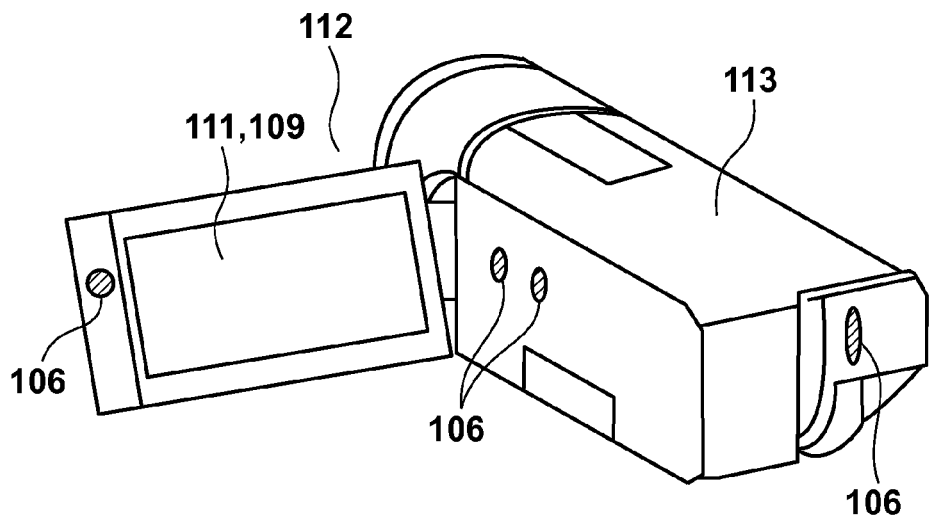
FIG. 1B shows one example of an external view of the moving image recording device.

FIG. 1B shows one example of an external view of a digital video camera which is an example of a moving image recording device according to an embodiment of the invention. This video camera includes a main body 113 provided with the camera unit 101 shown in FIG. 1A and a vari-angle LCD unit 112 that is rotatably attached to the main body 113 by a hinge. The LCD panel 111 and the touchscreen 109 are integrally configured and arranged on the vari-angle LCD unit 112. For example, the touchscreen 109 is configured in such a manner that the light transmittance does not obstruct the display of the LCD panel 111. The touchscreen 109 is attached to the top layer of the display surface of the LCD panel 111. Input coordinates on the touchscreen 109 are associated with display coordinates on the LCD panel 111. This makes it possible to configure a GUI that enables the user to operate a screen displayed on the LCD panel 111 in a direct manner. Note that the touchscreen 109 may be of any type, such as a resistive type, a capacitive type, a surface acoustic wave type, an infrared type, an electromagnetic induction type, an image recognition type, and an optical sensor type.

Furthermore, the CPU 107 can detect the following operations on the touchscreen 109.

Touch-down: the act of touching the touchscreen 109 with a finger or a pen.

Touch-on: the state where the touchscreen 109 is being touched by a finger or a pen.

Move: the act of moving a finger or a pen while it is touching the touchscreen 109.

Touch-up: the act of releasing a contact between the touchscreen 109 and a finger or a pen.

Touch-off: the state where nothing touches the touchscreen 109.

The above operations and the position coordinates at which a finger or a pen touches the touchscreen 109 are notified to the CPU 107. Based on the notified information, the CPU 107 determines what kind of operation the touchscreen 109 has received.

Regarding the move operation, the direction in which the finger or the pen moves on the touchscreen 109 is also determined in units of vertical and horizontal components on the touchscreen 109 based on changes in the position coordinates. When a touch-down operation, a certain move operation and a touch-up operation are continuously performed on the touchscreen 109 in this order, it is determined that a "stroke" has been performed.

An operation of quickly performing the stroke is called a "flick". The flick is an operation whereby the finger is quickly moved by a certain distance while touching the touchscreen 109 and then released from the touchscreen 109. In other words, the flick is an operation for quickly tracing or flicking the touchscreen 109 with the finger. It is determined that the flick has been performed when the touch-up operation is detected immediately after the move operation by is detected for a predetermined distance or longer at a predetermined speed or faster. On the other hand, it is determined that a "drag" has been performed when detecting the move operation by the predetermined distance or longer at a speed slower than the predetermined speed.

The aforementioned mode control task executed by the CPU 107 functions as follows. The mode control task causes transitions between operating states of the entire video camera in accordance with instructions from the operation units (the operation keys 106 and the touchscreen 109), requests from other tasks, or changes in the internal state managed by the mode control task itself. The mode control task also notifies task events.

Figure 2A:
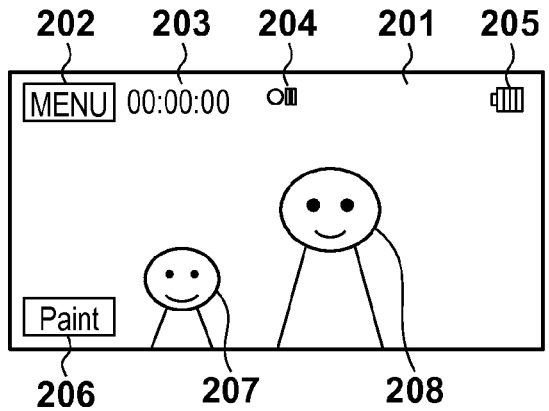
FIGS. 2A to 2F show exemplary compositions of displayed screens according to an embodiment of the invention.

FIGS. 2A to 2F are schematic diagrams showing examples of screens displayed on the LCD panel 111 during image capturing. FIG. 2A shows an example of a screen displayed on the LCD panel 111 in normal image capturing mode. Specifically, the whole LCD panel 111 displays the entirety of an image 201 captured by the camera unit 101 including objects 207 and 208 which are exemplary object images. Information of the video camera itself, namely image capture time information 203, a recording status icon 204 and remaining battery information 205, is displayed as an OSD in the upper right portion of the screen.

Furthermore, a menu button 202 and a hand-drawn input mode switch button 206, which are both touch buttons indicating that they can be touch-operated, are also displayed as an OSD on the screen. The above OSD items are displayed on the screen as additional information superimposed over the captured moving image and are referred to as "display items". In the example of FIG. 2A, the image capture time information 203, the recording status icon 204, the remaining battery information 205, and the aforementioned touch buttons are the display items.

Figure 2B:
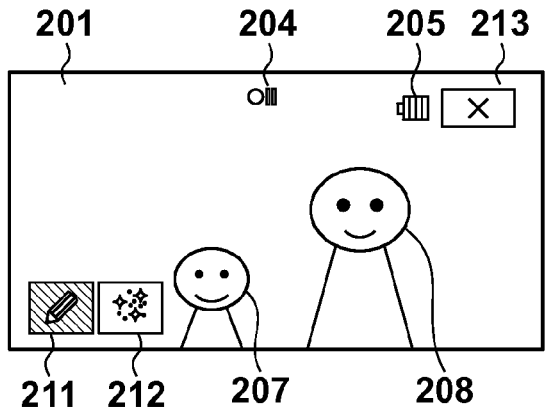

FIG. 2B shows an example of a screen displayed on the LCD panel 111 in hand-drawn input mode. Specifically, the whole LCD panel 111 displays the entirety of the image 201 captured by the camera unit 101 including the objects 207 and 208 which are exemplary object images. Information of the video camera itself, namely the recording status icon 204 and the remaining battery information 205, is displayed as an OSD in the upper right portion of the screen.

Furthermore, touch buttons, namely a hand-drawn input selection button 211, an animation selection button 212 and a close button 213 for switching to normal image capturing mode, are also displayed as an OSD on the screen.

Figure 2C:
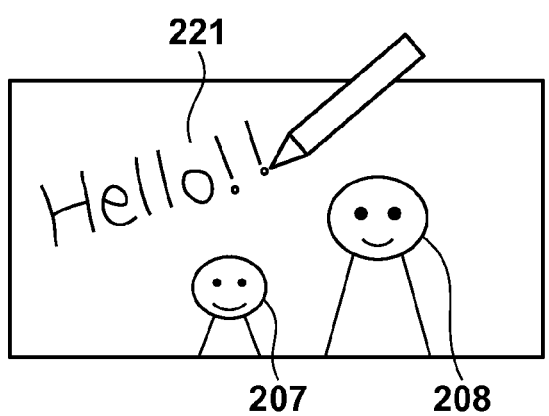

FIG. 2C shows an example of a screen displayed on the LCD panel 111 during the hand-drawn input. Specifically, the whole LCD panel 111 displays the entirety of the image 201 captured by the camera unit 101 including the objects 207 and 208 which are exemplary object images. A recorded superimposition text 221 which has been input through the hand-drawn input is displayed as an OSD in the upper left portion of the screen.

Unlike the aforementioned "display items", the texts and graphics input through the hand-drawn input or the animation input is superimposed over a recorded moving image. Therefore, while the recorded superimposition text 221 is displayed as a moving image during playback, the "display items" such as the menu button 202 are not displayed during playback. These screen displays superimposed over a recorded moving image are referred to as "superimposition items".

Figure 2D:
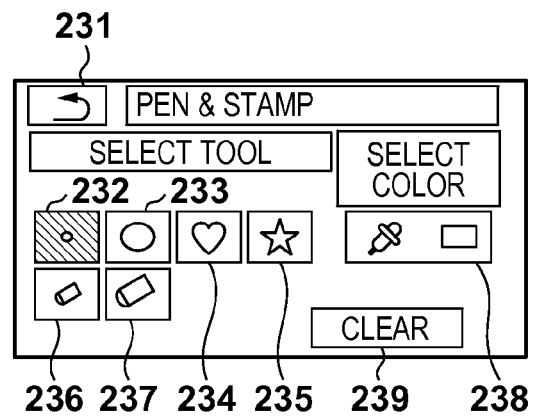

FIG. 2D shows an example of a screen displayed on the LCD panel 111 when the hand-drawn input has been selected. On this screen, the user can select a type of the hand-drawn input (a pen, a stamp or an eraser). Note that the screen shown in FIG. 2D is displayed when the hand-drawn input selection button 211 shown in FIG. 2B is touched.

A title of the screen and a return button 231 for returning to the previous screen are displayed as an OSD on the screen. Furthermore, a small pen tip button 232, a large pen tip button 233, a heart button 234, a star button 235, a small eraser button 236, and a large eraser button 237 are also displayed as an OSD for tool selection. The small pen tip button 232 and the large pen tip button 233 show the widths of the pen. The heart button 234 and the star button 235 show the types of the stamp. The small eraser button 236 and the large eraser button 237 show the types of the eraser.

Moreover, a color selection button 238 that allows selecting the color of the pen and the stamp, as well as a clear button 239 for clearing all "superimposition items", are also displayed.

When a pen or an eraser has been selected, by continuously tracing the screen from the point where the touch-down operation is performed to the point where the touch-up operation is performed during the hand-drawn input, a continuous line can be drawn along the locus. On the other hand, when a stamp has been selected, the selected stamp can be applied to the point where the touch-down operation is performed.

Figure 2E:
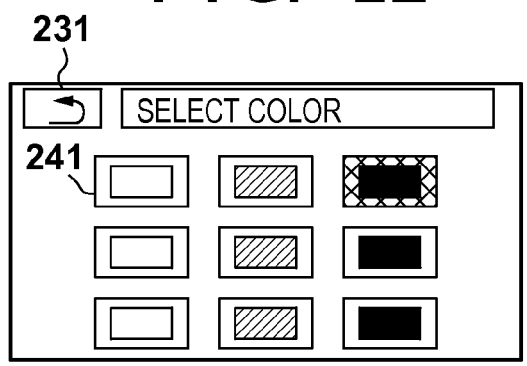

FIG. 2E shows an example of a color selection screen displayed on the LCD panel 111. On this screen, the user can select the color of the pen and the stamp. Note that the screen shown in FIG. 2E is displayed when the color selection button 238 shown in FIG. 2D is touched. The return button 231, a screen title, and color buttons 241 are displayed as an OSD on the screen.

Figure 2F:
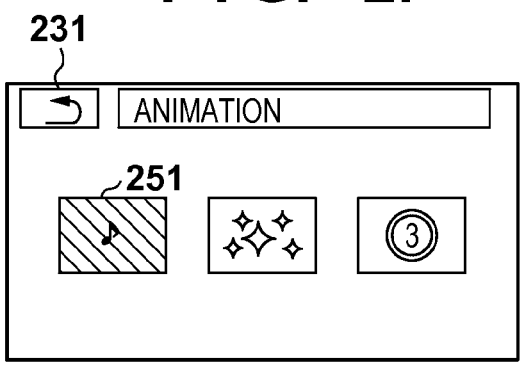

FIG. 2F shows an example of an animation selection screen displayed on the LCD panel 111. On this screen, the user can select the type of animation. Note that the screen shown in FIG. 2F is displayed when the animation selection button 212 shown in FIG. 2B is touched. The return button 231, a screen title, and animation buttons 251 are displayed as an OSD on the screen.

With reference to FIGS. 3A to 3C, the following describes examples of moving images recorded by the moving image recording device according to the present embodiment when the hand-drawn input is performed. FIG. 3A shows changes in a moving image recorded when performing a sequence of operations from the hand-drawn input using a pen to clearing of all superimposition items. It should be noted that screens (301, 302, 303, 304 and 305) represent different timings of the recorded moving image and are arranged in chronological order. In FIG. 3A, the screen 301 precedes the hand-drawn input, and the screens 302, 303 and 304 are in the state where an item has been superimposed as a result of the hand-drawn input using a pen. Also, in FIG. 3A, the screen 305 is obtained after all input items have been cleared using the clear button 239. Note that the hand-drawn input using a pen can be performed on the screen shown in FIG. 2B after selecting the small pen tip button 232 or the large pen tip button 233 on the screen shown in FIG. 2D.

FIG. 3B shows changes in a moving image recorded when performing a sequence of operations from the hand-drawn input using a stamp to clearing of all superimposition items. It should be noted that screens (311, 312, 313, 314 and 315) represent different timings of the recorded moving image and are arranged in chronological order. In FIG. 3B, the screen 311 precedes the hand-drawn input, and the screens 312, 313 and 314 are in the state where an item has been superimposed as a result of the hand-drawn input using a stamp. Also, in FIG. 3B, the screen 315 is obtained after all input items have been cleared using the clear button 239. Note that the hand-drawn input using a stamp can be performed on the screen shown in FIG. 2B after selecting the heart button 234 or the star button 235 on the screen shown in FIG. 2D.

FIG. 3C shows changes in a moving image recorded when performing a sequence of operations consisting of the hand-drawn input using a pen, deletion of a part of superimposition items using an eraser, and clearing of all superimposition items. It should be noted that screens (321, 322, 323 and 324) represent different timings of the recorded moving image and are arranged in chronological order. In FIG. 3C, the screen 321 precedes the hand-drawn input, and the screen 322 is in the state where an item has been superimposed as a result of the hand-drawn input using a pen. The screen 323 is obtained after a part of the hand-drawn text has been deleted using an eraser, and the screen 324 is obtained after all input items have been cleared using the clear button 239. Note that the deletion using the eraser can be input on the screen shown in FIG. 2B after selecting the small eraser button 236 or the large eraser button 237 on the screen shown in FIG. 2D.

Figure 4:
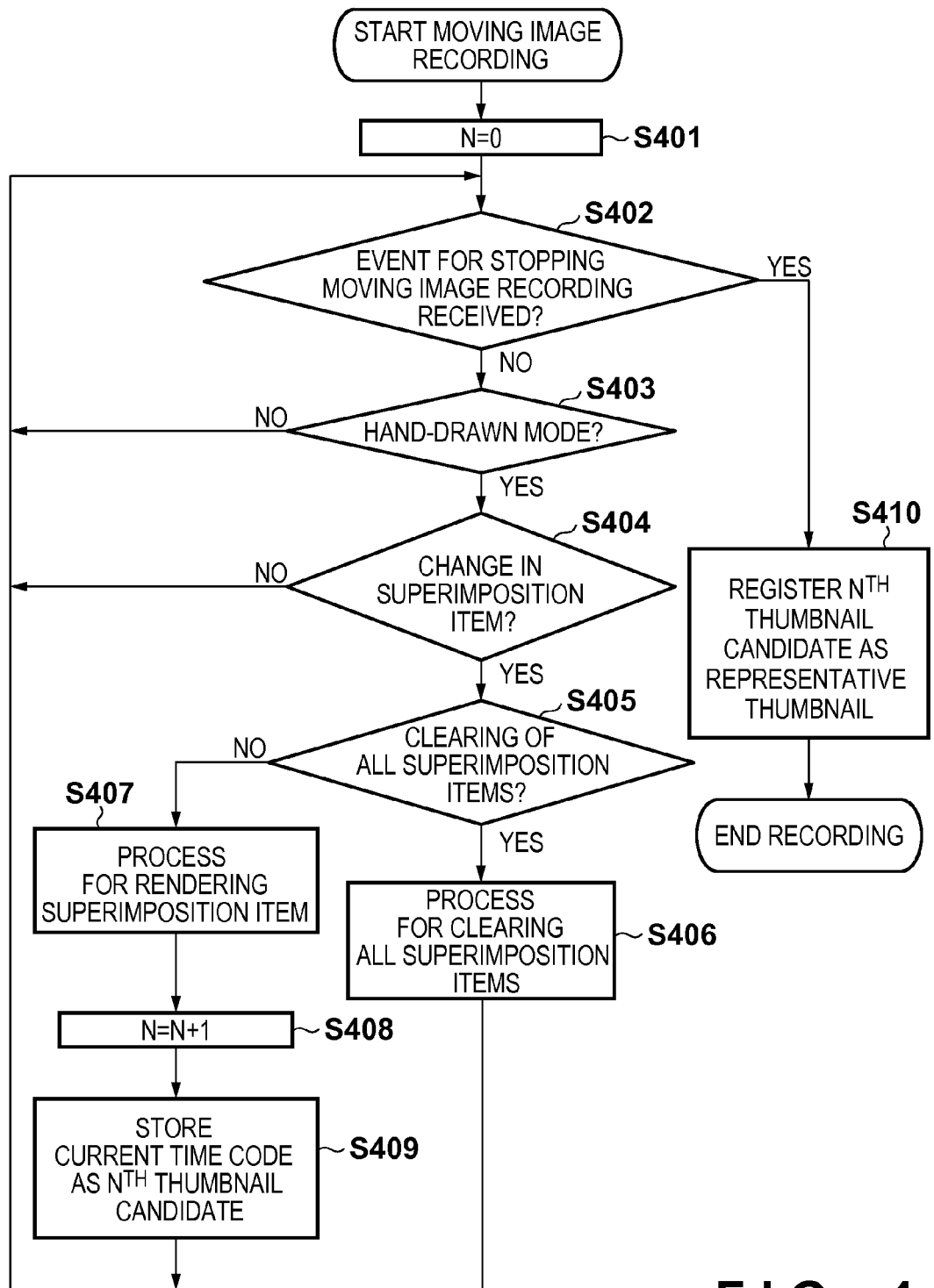
FIG. 4 is a flowchart showing one example of moving image recording processing according to First Embodiment of the invention.

FIG. 4 is a flowchart of processing executed by the CPU 107 to generate a thumbnail between the start and stop of moving image recording (superimposition recording) in the present embodiment. This processing can be realized by the CPU 107 reading and executing programs from the program/data storage unit 108.

First, in S401, the CPU 107 performs the default setting, i.e. sets a default value 0 to the number N for managing a thumbnail image and a thumbnail candidate. It should be noted that in the case where a superimposition item had been drawn prior to the recording, a default value 1 is set to the number N, and a time code at the start is recorded in a unique management file as a thumbnail candidate. The unique management file will be described later.

Next, in S402, the CPU 107 determines whether or not it has received an event for stopping the moving image recording. When the CPU 107 has received the event for stopping the moving image recording (the YES branch of S402), it proceeds to S410. On the other hand, when the CPU 107 has not received the event for stopping the moving image recording (the NO branch of S402), it proceeds to S403. In S403, the CPU 107 determines whether or not the hand-drawn mode is in effect. When the hand-drawn mode is not in effect (the NO branch of S403), the CPU 107 returns to S402 and repeats the same processes. On the other hand, when the hand-drawn mode is in effect (the YES branch of S403), the CPU 107 proceeds to S404.

In S404, the CPU 107 determines whether or not there has been a change in a superimposition item. When there has been no change in the superimposition item (the NO branch of S404), the CPU 107 returns to S402 and repeats the same processes. On the other hand, when there has been a change in the superimposition item (the YES branch of S404), the CPU 107 proceeds to S405. Note that a change in a superimposition item denotes issuance of an event for changing the superimposition item through item superimposition processing, such as the hand-drawn input using a pen, a stamp, an eraser, etc.

In S405, the CPU 107 determines whether or not the event for changing the superimposition item corresponds to clearing of all superimposition items. When the event for changing the superimposition item corresponds to clearing of all superimposition items (the YES branch of S405), the CPU 107 proceeds to S406. On the other hand, when the event for changing the superimposition item does not correspond to clearing of all superimposition items (the NO branch of S405), the CPU 107 proceeds to the process of S407. In S406, the CPU 107 executes a process for clearing all superimposition items. Thereafter, the CPU 107 returns to S402 and repeats the same processes.

In S407, the CPU 107 executes a process for rendering a superimposition item. The details of this process vary among different rendering input methods. For example, in the case of the hand-drawn input using a pen, the rendering process is executed with respect to the coordinates that are touched from when a touch-on operation is performed to when a touch-up operation is performed. In the case of the hand-drawn input using a stamp, the rendering process is executed using one stamp with respect to the coordinates at which a touch-on operation is performed. In the case of the hand-drawn input using an eraser, a process for deleting the rendered superimposition item is executed with respect to the coordinates that are touched from when a touch-on operation is performed to when a touch-up operation is performed. After the rendering process of S407, the CPU 107 proceeds to the process of S408.

The CPU 107 increments the number N in S408, and then proceeds to the process of S409. In S409, the CPU 107 records the current time code in the unique management file as the $N^{th}$ thumbnail candidate. Information showing association between each moving image data and a corresponding time code included in a thumbnail candidate list is described in the unique management file. A representative thumbnail can be registered out of the thumbnail candidate list and is displayed upon display of the index during playback mode. Although the unique management file is prepared as a means to record a time code in the present embodiment, the time code may instead be included in meta-information of moving image data or be deployed to a RAM. After the storing process of S409, the CPU 107 returns to S402 and repeats the same processes.

In S410, the $N^{th}$ thumbnail is registered as a representative thumbnail. Thereafter, the moving image recording is ended. In the present embodiment, the representative image (thumbnail image) is registered by recording a time code of the $N^{th}$ thumbnail in header information of a moving image file of the moving image data. In this way, at the time of, for example, index playback that uses the representative image (thumbnail image), a frame of the moving image that should be displayed as a thumbnail can be identified by referring to the header portion of the moving image file. The identified frame image is extracted from the moving image data (decoded and extracted as a still image) and displayed. Alternatively, information other than the time code may be recorded as long as it can identify a frame that should be used as a representative image.

The representative image (thumbnail image) may be registered using the following methods.

In S410, a frame image indicated by a time code of the $N^{th}$ thumbnail is extracted from the moving image data, resized and compressed as necessary, and recorded in the header portion of the moving image file as still image data.

In S410, a frame image of the moving image indicated by a time code of the $N^{th}$ thumbnail is extracted, resized and compressed as necessary, and recorded in another file as still image data in association with the moving image file.

In S410, a time code of the $N^{th}$ thumbnail (or another information that can identify a frame that should be used as a representative image) is recorded separately from the moving image file in association with the moving image file.

According to the above processes, upon receiving an event for changing a display item that does not correspond to clearing of all superimposition items, a time code is added as a thumbnail candidate after the rendering process. A thumbnail that is added last is registered as a representative thumbnail. That is to say, the representative thumbnail shows the state where the last hand-drawn input has been made. In this way, a thumbnail desirable for the user can be displayed. In the examples of FIGS. 3A to 3C, images of the screens 304, 314 and 323 are used as representative thumbnails.

The following describes timings for adding thumbnail candidates to the list and registration of a representative thumbnail with reference to the timing charts of FIGS. 5A to 5E. In FIGS. 5A to 5E, horizontal axes denote time (t), and boxes above the time axes denote events. Furthermore, rhombuses denote timings at which the thumbnail candidates are recorded. In FIGS. 5A to 5E, "recording start" denotes the start of superimposition recording, "recording stop" denotes the stop of superimposition recording, and "changing process" denotes changing of a superimposition item through the hand-drawn input using a pen, a stamp, an eraser, etc. The length of the box of each changing process along the time axes represents a time period from when an event for causing the change is received to when the rendering process is ended.

Also, clear-all denotes a process for clearing all superimposition items when the clear button 239 is touched.

In FIG. 5A, following the recording start, two changing processes, a clear-all process, and a changing process are executed in this order, and then the recording is stopped. The first process executed after the recording start is a changing process. Therefore, at a position that follows this changing process, a rhombus is drawn, meaning that the first thumbnail candidate is added to the thumbnail candidate list. The next process is also a changing process. Therefore, at a position that follows this changing process, a rhombus is drawn, meaning that the second thumbnail candidate is added to the thumbnail candidate list. The next process is a clear-all process, and therefore no change is made to the thumbnail candidate list. The clear-all process is followed by a changing process. Therefore, at a position that follows this changing process, a rhombus is drawn, meaning that the third thumbnail candidate is added to the thumbnail candidate list. Thereafter, the recording is stopped. Hence, the third thumbnail is registered as a representative thumbnail. In this case, the representative thumbnail is a frame image obtained after the last change in the superimposed state of the superimposition item.

In FIG. 5B, following the recording start, two changing processes and a clear-all process are executed in this order, and then the recording is stopped. The first process executed after the recording start is a changing process. Therefore, at a position that follows this changing process, a rhombus is drawn, meaning that the first thumbnail candidate is added to the thumbnail candidate list. The next process is also a changing process. Therefore, at a position that follows this changing process, a rhombus is drawn, meaning that the second thumbnail candidate is added to the thumbnail candidate list. The next process is a clear-all process, and therefore no change is made to the thumbnail candidate list. Thereafter, the recording is stopped. Hence, the second thumbnail is registered as a representative thumbnail. In this case, the representative thumbnail is a frame image obtained after the last change in the superimposed state of the superimposition item prior to the clear-all process.

In FIG. 5C, following the recording start, two changing processes are executed in sequence, and then the recording is stopped. The first process executed after the recording start is a changing process. Therefore, at a position that follows this changing process, a rhombus is drawn, meaning that the first thumbnail candidate is added to the thumbnail candidate list. The next process is also a changing process. Therefore, at a position that follows this changing process, a rhombus is drawn, meaning that the second thumbnail candidate is added to the thumbnail candidate list. Thereafter, the recording is stopped. Hence, the second thumbnail is registered as a representative thumbnail. In this case, the representative thumbnail is a frame image obtained after the last change in the superimposed state of the superimposition item.

In FIG. 5D, following the recording start, only a clear-all process is executed, and then the recording is stopped. The first process executed after the recording start is the clear-all process, and therefore no change is made to the thumbnail candidate list. Thereafter, the recording is stopped. That is to say, there is no thumbnail candidate list, and no representative thumbnail is registered.

In FIG. 5E, following the recording start, the recording is stopped. There is no change in the thumbnail candidate list. That is to say, there is no thumbnail candidate list, and no representative thumbnail is registered.

In the present embodiment, time codes are added as the thumbnail candidate list in the unique management file. However, instead of the time codes, time stamps indicating certain time points of moving image data may be added. Furthermore, image data at certain time points may be deployed to a RAM, a built-in memory or an external recording device.

Although the above has described the case where a superimposition item is changed in accordance with the hand-drawn input using a touchscreen, the superimposition item may instead be changed in accordance with the input using operation keys and a pointing system. In the present embodiment, a thumbnail is generated immediately after a process for drawing a superimposition item. It should be noted, however, that the number of images that serve as thumbnail candidates increases if the drawing processes are input continuously. In view of this, after the drawing is performed subsequent to reception of an event for changing a superimposition item, a thumbnail may be generated when a predetermine time period has elapsed without receiving another event for changing a superimposition item. In this case, a representative thumbnail is a frame image over which a superimposition item changed based on the event serving as the start point of the predetermined time period has been superimposed.

Second Embodiment

First Embodiment has described the processing for adding a thumbnail candidate to the thumbnail candidate list after a process for changing a superimposition item with reference to the flowchart of FIG. 4. However, embodiments of the invention are not limited in this way. The following describes another embodiment as Second Embodiment of the present invention in relation to timings for adding thumbnail candidates to the thumbnail candidate list. Second Embodiment is similar to First Embodiment in, for example, the configuration of the main body and the screens displayed at the time of hand-drawn operations shown in FIGS. 1A to 3C.

Figure 6A:
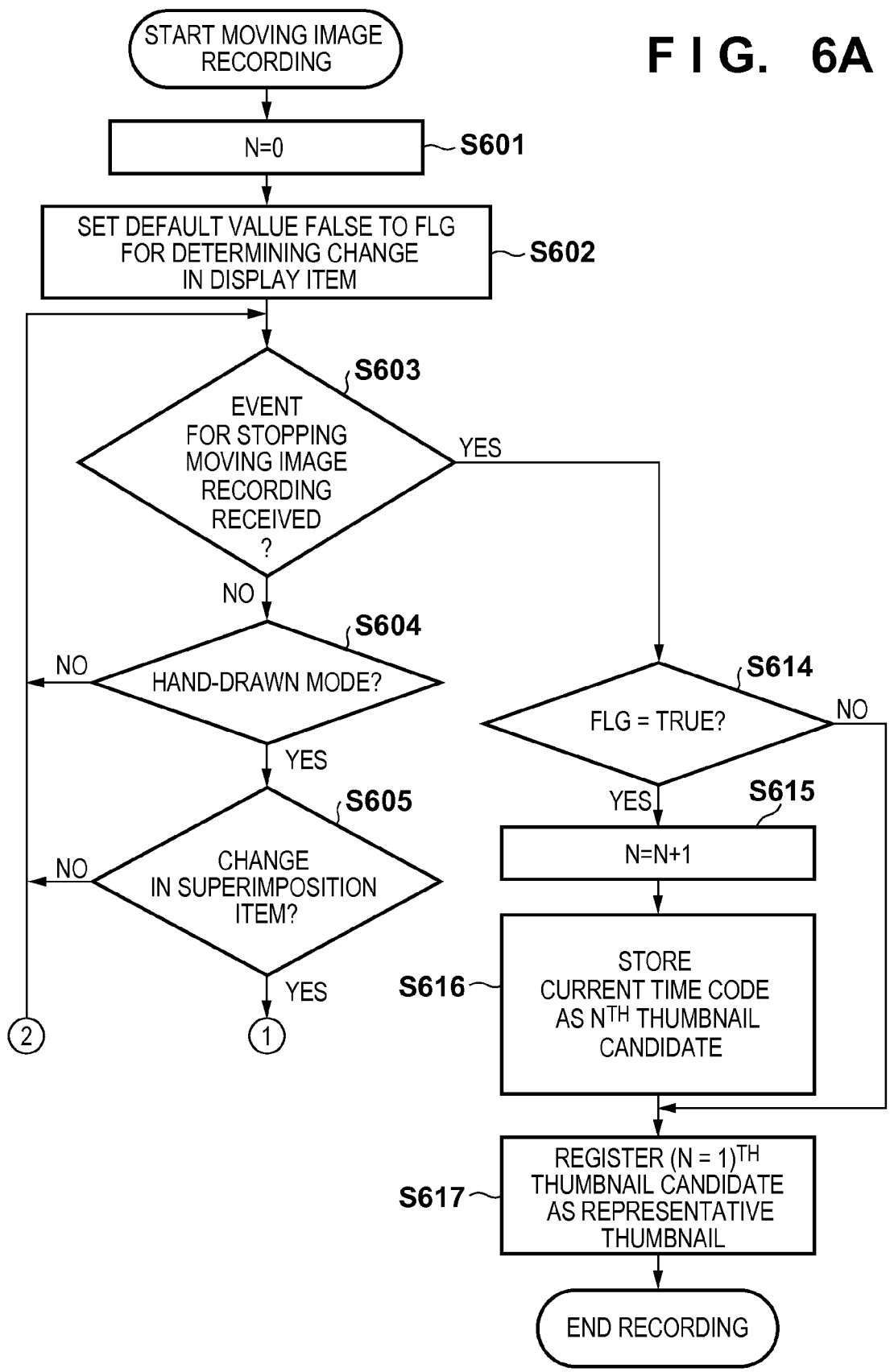
FIGS. 6A and 6B are flowcharts showing one example of moving image recording processing according to Second Embodiment of the invention.
Figure 6B:
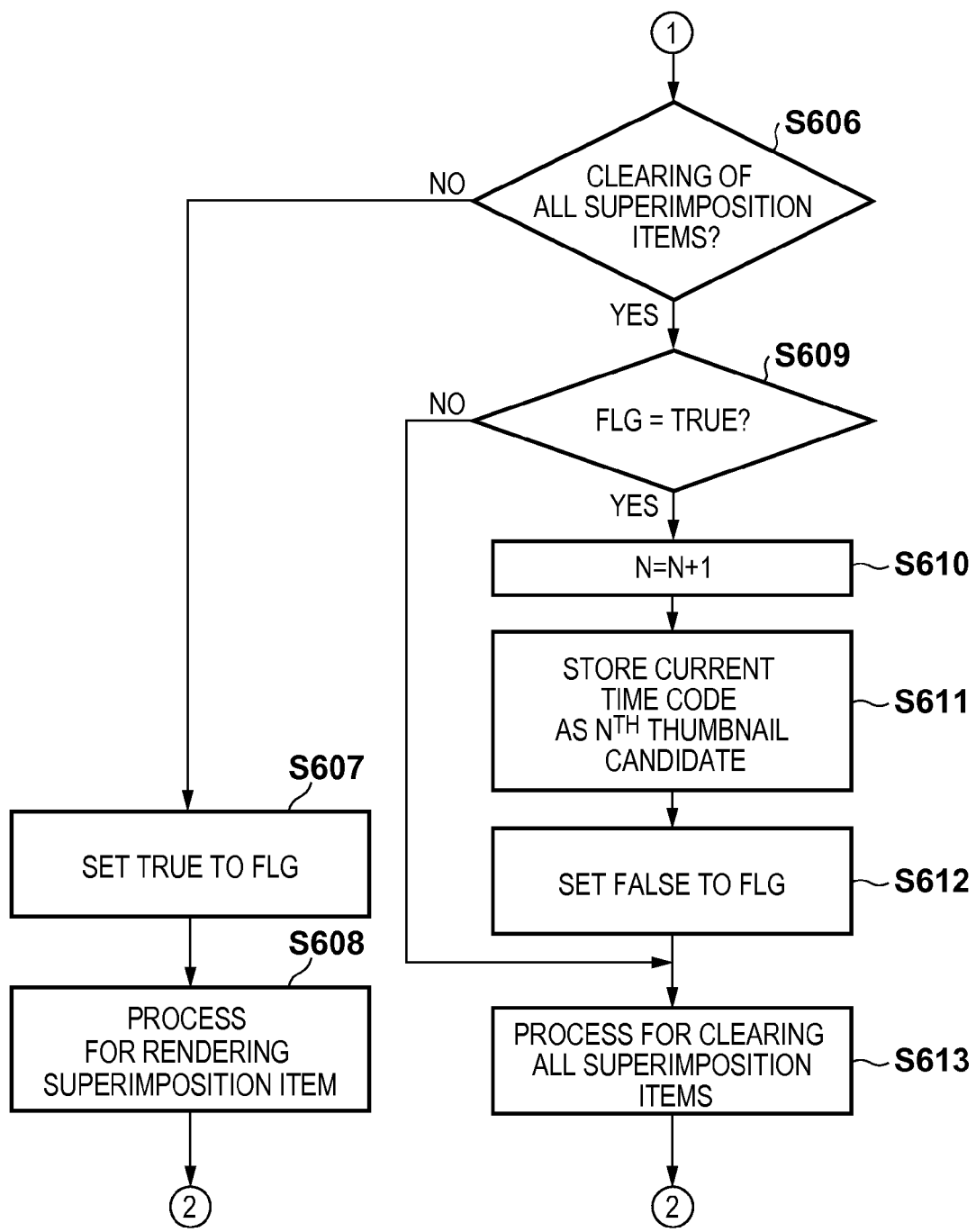

FIGS. 6A and 6B are flowcharts of processing executed by the CPU 107 to generate a thumbnail between the start and stop of moving image recording (superimposition recording) in the present embodiment. This processing can be realized by the CPU 107 reading and executing programs from the program/data storage unit 108.

First, in S601, the CPU 107 performs the default setting, i.e. sets a default value 0 to the number N for managing a thumbnail image and a thumbnail candidate. Next, in S602, the CPU 107 performs the default setting, i.e. sets a default value "False" to a flag (Flg) for determining a change in a superimposition item. It should be noted that in the case where a superimposition item had been drawn prior to image capturing, a default value "True" is set to the Flg.

Thereafter, in S603, the CPU 107 determines whether or not it has received an event for stopping the moving image recording. When the CPU 107 has received the event for stopping the moving image recording (the YES branch of S603), it proceeds to the process of S614. On the other hand, when the CPU 107 has not received the event for stopping the moving image recording (the NO branch of S603), it proceeds to S604. In S604, the CPU 107 determines whether or not the hand-drawn mode is in effect. When the hand-drawn mode is not in effect (the NO branch of S604), it returns to S603 and executes the same processes. On the other hand, when the hand-drawn mode is in effect (the YES branch of S604), the CPU 107 proceeds to S605.

In S605, the CPU 107 determines whether or not there has been a change in a superimposition item. When there has been no change in the superimposition item (the NO branch of S605), the CPU 107 returns to S603 and repeats the same processes. On the other hand, when there has been a change in the superimposition item (the YES branch of S605), the CPU 107 proceeds to S605. Whether or not there has been a change in a superimposition item is determined based on whether or not an event has been issued for changing the superimposition item through the hand-drawn input using a pen, a stamp, an eraser, etc.

In S606, the CPU 107 determines whether or not the event for changing the superimposition item corresponds to clearing of all superimposition items. When the event for changing the superimposition item corresponds to clearing of all superimposition items (the YES branch of S606), the CPU 107 proceeds to S609. On the other hand, when the event for changing the superimposition item does not correspond to clearing of all superimposition items (the NO branch of S606), the CPU 107 proceeds to the process of S607. As there has been a change in the superimposition item, the CPU 107 sets "True" as the Flg value for determining a change in the superimposition item in S607. The CPU 107 then proceeds to the process of S608. In S608, the CPU 107 executes a process for rendering a superimposition item. This process is similar to the process of S407 explained in First Embodiment. The details of this process vary among different rendering input methods. After the rendering process of S608, the CPU 107 returns to S603 and repeats the same processes.

In S609, the CPU 107 determines whether or not "True" is set as the Flg value for determining a change in the superimposition item. When "True" is set as the Flg value (the YES branch of S609), the CPU 107 executes the process of S610. When "False" is set to the Flg (the NO branch of S609), the CPU 107 executes the process of S613. The CPU 107 increments the number N in S610, and then proceeds to the process of S611. In S611, the CPU 107 records the current time code in a unique management file as the $N^{th}$ thumbnail candidate. Information showing association between each moving image data and a corresponding time code included in a thumbnail candidate list is described in the unique management file. A representative thumbnail can be registered out of the thumbnail candidate list and is displayed upon display of the index during playback mode. Although the unique management file is prepared as a means to record a time code in the present embodiment, the time code may instead be included in meta-information of moving image data or be deployed to a RAM.

As the time code has been added to the thumbnail candidate list, the CPU 107 sets "False" as the Flg value for determining a change in the superimposition item in S612. Thereafter, the CPU 107 proceeds to the process of S613. In S613, the CPU 107 executes a process for clearing all superimposition items. The CPU 107 then returns to S603 and repeats the same processes.

In S614, the CPU 107 determines whether or not "True" is set as the Flg value for determining a change in the superimposition item. When "True" is set as the Flg value (the YES branch of S614), the CPU 107 proceeds to the process of S615. On the other hand, when "False" is set as the Flg value (the NO branch of S614), the CPU 107 proceeds to S617. The CPU 107 increments the number N in S615, and then proceeds to the process of S616. In S616, the CPU 107 records the current time code in the unique management file as the $N^{th}$ thumbnail candidate, as with the process of S611. Note that the processes of S614 and S615 are executed to register a frame image that immediately precedes the stop of the moving image recording as a thumbnail candidate when the user has not cleared all superimposition items. In S617, the $(N=1)^{th}$ thumbnail is registered as a representative thumbnail. Thereafter, the moving image recording is ended. The registering process is similar to First Embodiment. Note that when there is no $(N=1)^{th}$ thumbnail, the moving image recording is ended without registering a representative thumbnail. This is a process corresponding to the case where the Flg value remains as "False" because a changing process has not been executed, such as the cases of FIGS. 8D and 8E described later.

According to the above-described processing, a screen over which a changed superimposition item has been superimposed and which precedes clearing of all superimposition items, or a screen over which a changed superimposition item has been superimposed and which precedes the recording stop, can be used as a thumbnail candidate. That is to say, the state of display of a screen on which the hand-drawn input has been performed is used as-is as a thumbnail. This makes it possible to generate a thumbnail desirable for the user.

Compared to First Embodiment, thumbnail candidates are not updated each time the superimposition item is changed. In this way, the number of thumbnail candidates can be reduced, and the efficiency of extraction of thumbnail candidates can be improved. In the examples of FIGS. 3A to 3C, the screens 304, 314 and 323 are used as representative thumbnails in a manner similar to First Embodiment. It has been described above that the first thumbnail candidate in the thumbnail candidate list is registered as the representative thumbnail. Alternatively, any thumbnail candidate in the list may be registered as the representative thumbnail. For example, there may be cases where multiple clear-all processes are executed prior to an event for stopping the moving image recording. In such cases, a screen shown in FIG. 7 may be displayed. Specifically, this screen shows screens that immediately precede the multiple clear-all processes as a thumbnail candidate list so the user can select a representative thumbnail from the thumbnail candidate list.

In S617, only the $(N=1)^{th}$ thumbnail candidate is registered as the representative thumbnail. Alternatively, all N thumbnail candidates (i.e. a plurality of thumbnail candidates) recorded in the unique management file may be recorded as representative images in association with the moving image (that is to say, N time codes may be recorded). In this way, frame images corresponding to the N recorded time codes can be displayed on a screen displaying a plurality of thumbnail images of a single moving image, e.g. on a screen displaying a timeline of the single moving image. The frame images corresponding to the N time codes all immediately precede clearing of all superimposition items, and are therefore in the state where a large number of superimposition items have been superimposed. By displaying such multiple frame images in an array in the form of, for example, timeline display, a plurality of frames that make a strong impression on the user from the moving image can be displayed in an array. On a screen that displays only one representative image per moving image, such as a screen that displays a file list, it suffices to display a frame image corresponding to one of the N time codes.

The following describes timings for adding thumbnail candidates to the list and registration of a representative thumbnail with reference to the timing charts of FIGS. 8A to 8E. In FIGS. 8A to 8E, horizontal axes denote time (t), and boxes above the time axes denote events. Furthermore, rhombuses denote timings at which the thumbnail candidates are recorded. In FIGS. 8A to 8E, "recording start" denotes the start of superimposition recording, "recording stop" denotes the stop of superimposition recording, and "changing process" denotes changing of a superimposition item through the hand-drawn input using a pen, a stamp, an eraser, etc. The length of the box of each changing process along the time axes represents a time period from when an event for causing the change is received to when the rendering process is ended. Also, clear-all denotes a process for clearing all superimposition items when the clear button 239 is touched.

In FIG. 8A, following the recording start, two changing processes, a clear-all process, and a changing process are executed in this order, and then the recording is stopped. As the first process executed after the recording start is a changing process, "True" is set as the Flg value indicating execution of a changing process. As the next process is also a changing process, the Flg value indicating execution of a changing process remains as "True". The next process is a clear-all process, and the Flg value remains as "True". Therefore, a rhombus is drawn before the clear-all process, meaning that an image of a screen over which a superimposition item has been superimposed is added to the thumbnail candidate list as the first thumbnail candidate. As the clear-all process has been executed, "False" is set as the Flg value indicating execution of a changing process. The next process is a changing process. Accordingly, "True" is set again as the Flg value indicating execution of a changing process. The next process is the recording stop. As "True" is set as the Flg value, a rhombus is drawn before the recording stop. That is to say, an image of a screen displaying the result of the changing process executed immediately before the rhombus is added to the thumbnail list as the second thumbnail candidate. According to the flowchart of the processing shown in FIGS. 6A and 6B, the first thumbnail candidate is used as the representative thumbnail. That is to say, a frame image that immediately precedes the clear-all process is used as the representative thumbnail. In the case where the user can select a representative thumbnail using the screen shown in FIG. 7, the first and second thumbnail candidates are displayed as the list, and the user can determine the representative thumbnail by selecting one of them. If the second thumbnail candidate is selected, a frame image that immediately precedes the end of the item superimposition processing is used as the representative thumbnail.

In FIG. 8B, following the recording start, two changing processes and a clear-all process are executed in this order, and then the recording is stopped. As the first process executed after the recording start is a changing process, "True" is set as the Flg value indicating execution of a changing process. As the next process is also a changing process, the Flg value indicating execution of a changing process remains as "True". The next process is a clear-all process. As "True" is set as the Flg value, a rhombus is drawn before the clear-all process, meaning that an image of the displayed screen is added to the thumbnail candidate list as the first thumbnail candidate. As the clear-all process has been executed, "False" is set as the Flg value indicating execution of a changing process. The next process is the recording stop. As "False" is set as the Flg value, the thumbnail candidate list is not updated. Therefore, the first thumbnail candidate is used as the representative thumbnail. That is to say, a frame image that immediately precedes the clear-all process is used as the representative thumbnail.

In FIG. 8C, following the recording start, two changing processes are executed in sequence, and then the recording is stopped. As the first process executed after the recording start is a changing process, "True" is set as the Flg value indicating execution of a changing process. As the next process is also a changing process, the Flg value indicating execution of a changing process remains as "True". The next processing is the recording stop. As "True" is set as the Flg value, a rhombus is drawn before the recording stop, meaning that the first thumbnail candidate is added to the thumbnail list. Therefore, the first thumbnail candidate is used as the representative thumbnail. That is to say, a frame image that immediately precedes the end of the item superimposition processing is used as the representative thumbnail.

In FIG. 8D, following the recording start, only a clear-all process is executed, and then the recording is stopped. As the first process executed after the recording start is the clear-all process and "False" is set as the Flg value, the thumbnail candidate list is not updated. The next process is the recording stop. As the Flg value remains as "False", the thumbnail candidate list is not updated. Therefore, no representative thumbnail is registered.

In FIG. 8E, following the recording start, the recording is stopped. As "False" is set as the Flg value at the time of the recording stop, the thumbnail candidate list is not updated. Therefore, no representative thumbnail is registered.

In the present embodiment, time codes are added as the thumbnail candidate list in the unique management file. However, instead of the time codes, time stamps indicating certain time points of moving image data may be added. Furthermore, image data at certain time points may be deployed to a RAM, a built-in memory or an external recording device.

Although the above has described the case where a displayed superimposition item is changed through the hand-drawn input using a touchscreen, the displayed superimposition item may instead be changed through the input using operation keys and a pointing system.

Third Embodiment

In First Embodiment and Second Embodiment described above, a thumbnail candidate is generated by estimating a timing at which the rendering of a superimposition item is ended. However, a thumbnail candidate is not necessarily limited to being generated when the rendering is ended. For example, should animation composed of a plurality of steps be selected as a superimposition item, there may be cases where a frame image obtained during the rendering (in the middle of the animation) is desired to be used as a thumbnail.

In view of this, Third Embodiment describes the case where a superimposition item is animation. The present embodiment is similar to First Embodiment and Second Embodiment in the configuration of the image recording device and generation of the thumbnail candidate list. Therefore, the configuration of the image recording device and generation of the thumbnail candidate list are omitted from the following description.

Figure 9A:
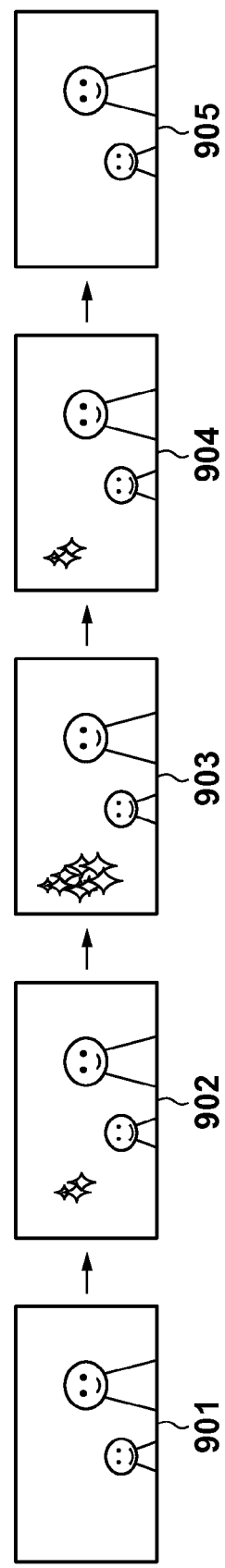
FIGS. 9A and 9B show exemplary transitions in displayed screens according to Third Embodiment of the invention.
Figure 9B:
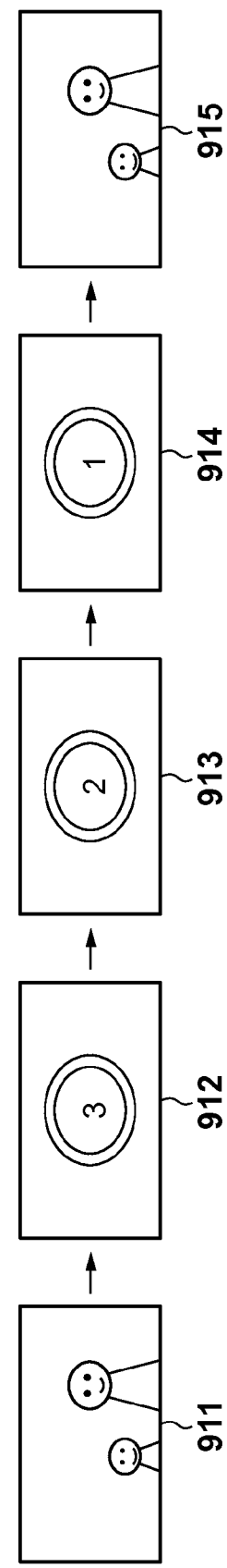

FIGS. 9A and 9B are schematic diagrams showing examples of a moving image recorded when animation is input. FIG. 9A shows an example of animation displayed on a part of a screen, and more specifically changes in a recorded moving image from when the animation is input to when the animation is ended. It should be noted that screens (901, 902, 903, 904 and 905) are examples of screens of the recorded moving image displayed at different timings, and are arranged in chronological order. In FIG. 9A, the screen 901 precedes the hand-drawn input, the screens 902, 903 and 904 are obtained during the rendering of animation, and the screen 905 is obtained after the animation is ended. Note that the animation input can be performed on the screen shown in FIG. 2B after selecting the animation button 251 on the screen shown in FIG. 2F.

FIG. 9B shows an example of animation displayed on the entirety of a screen, and more specifically changes in a recorded moving image from when the animation is input to when the animation is ended. It should be noted that screens (911, 912, 913, 914 and 915) are examples of screens of the recorded moving image displayed at different timings, and are arranged in chronological order. In FIG. 9B, the screen 911 precedes the hand-drawn input, the screens 912, 913 and 914 are obtained during the rendering of animation, and the screen 915 is obtained after the animation is ended. Note that FIG. 9B is similar to FIG. 9A in the animation input procedure.

In the example of FIG. 9A, it is considered that the screen 903 with the largest number of displayed items is desired to be displayed as a thumbnail image. In the example of FIG. 9B, it is considered that the screen 912 at the start of the animation is desired to be displayed as a thumbnail image. As such, when the animation is input, it is assumed that a timing at which the user expects addition of a thumbnail candidate varies depending on the contents and types of the displayed animation. Therefore, in the case of the animation input, a thumbnail generation timing management file is prepared in which a timing for registering a thumbnail is described.

The following is a more specific description of the structure of the thumbnail generation timing management file. For example, assume the case where animation is composed of 240 steps (it may be considered that one step corresponds to one frame). In this file, out of the 240 steps, a step number corresponding to the state of the animation that the user wishes to be used as a thumbnail candidate is registered as a timing for thumbnail registration. For example, when the $120^{th}$ step corresponds to that state, 120 is registered as information indicative of the timing. Note that the number of steps set as the timing is not limited to one, but may be more than one. In this case, the user may select the most preferable image using the selection screen shown in FIG. 7. Thumbnail generation timing management files may be prepared in one-to-one correspondence with animations. In this case, each thumbnail generation timing management file sets a timing for thumbnail registration for corresponding animation on an individual basis.

Figure 10:
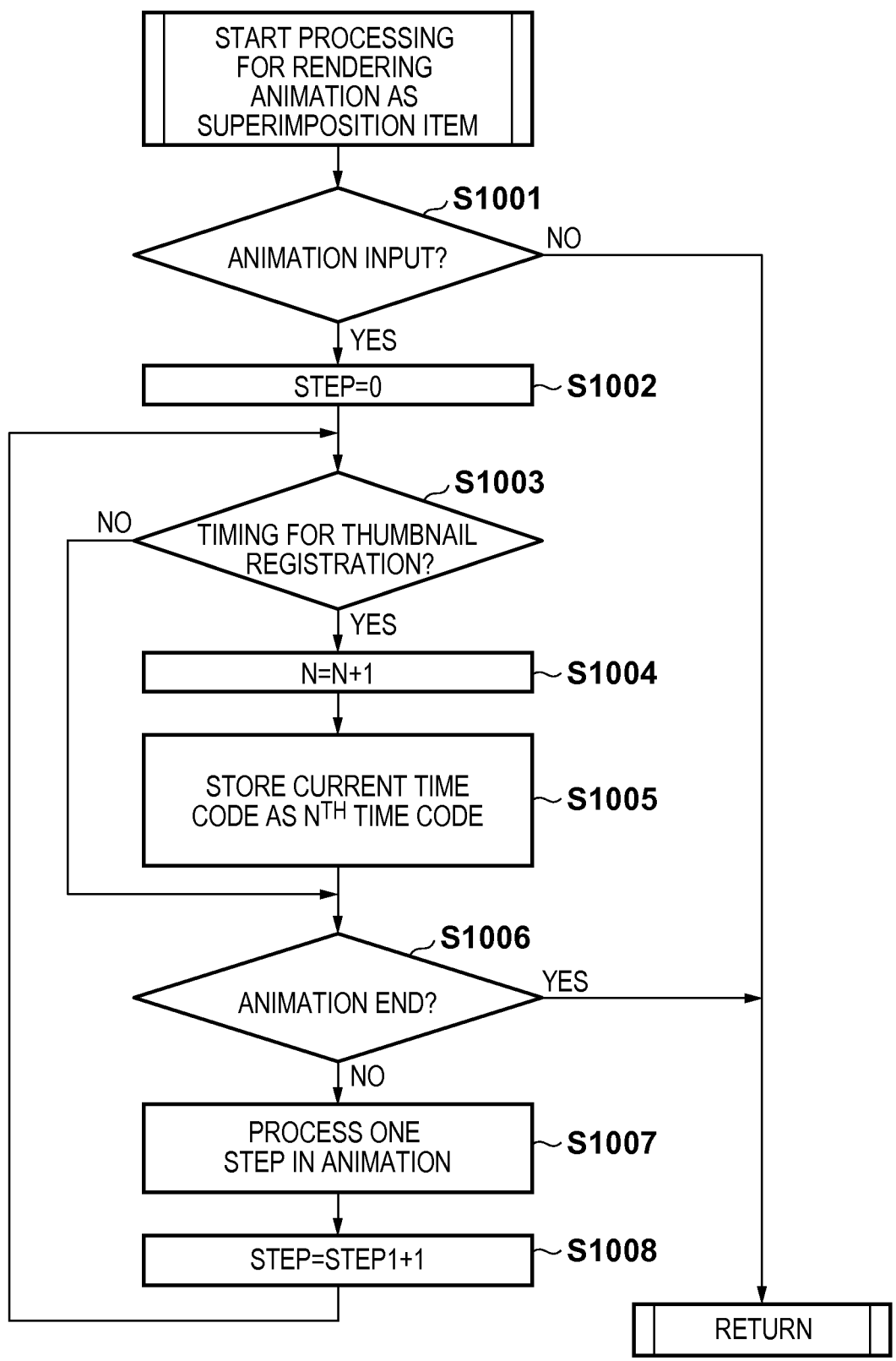
FIG. 10 is a flowchart showing one example of animation rendering processing according to Third Embodiment of the invention.

The following describes an example in which an arbitrary timing during the rendering of animation is added to the list as a thumbnail candidate. FIG. 10 shows processing for rendering animation as a superimposition item and for storing a time code. To be more specific, in the case of FIG. 4, the processing of FIG. 10 can be executed between, for example, S402 and S403. In the case of FIGS. 6A and 6B, the processing of FIG. 10 can be executed between, for example, S603 and S604. This processing can be realized by the CPU 107 reading and executing programs from the program/data storage unit 108.

First, in S1001, whether or not animation has been input is determined. When animation has been input (the YES branch of S1001), the processing moves to S1002. On the other hand, when animation has not been input (the NO branch of S1001), the present processing is ended. In First Embodiment and Second Embodiment, the present processing is followed by S403 or S604 and the processing for hand-drawn mode is executed.

In S1002, the CPU 107 sets a default value 0 to Step which indicates the number of steps in the animation, and proceeds to the process of S1003. In S1003, the CPU 107 determines whether or not the current step is a predetermined step corresponding to a timing for thumbnail registration with reference to a thumbnail generation timing management file corresponding to the animation. In the case of the aforementioned example in which the animation is composed of 240 steps, the CPU 107 determines whether or not the current step is the $120^{th}$ step. When the current step does not correspond to the timing for registration (the NO branch of S1003), the CPU 107 proceeds to the process of S1006. On the other hand, when the current step corresponds to the timing for registration (the YES branch of S1003), the CPU 107 proceeds to the process of S1004. The CPU 107 increments the number N in S1004, and then proceeds to the process of S1005.

In S1005, the CPU 107 records the current time code in the unique management file as the $N^{th}$ thumbnail candidate. Thereafter, the CPU 107 proceeds to the process of S1006. This unique management file is similar to the one described in the above First Embodiment and Second Embodiment.

In S1006, the CPU 107 determines whether or not the animation has been ended. When the animation has been ended (the YES branch of S1006), the processing for rendering the superimposition item is ended. On the other hand, when the animation has not been ended (the NO branch of S1006), the CPU 107 proceeds to the process of S1007. The CPU 107 processes one step in the animation in S1007, and then proceeds to the process of S1008. In S1008, the CPU 107 increments Step which indicates the number of steps in the animation. Thereafter, the CPU 107 returns to S1003 and repeats the same processes.

As set forth above, when animation is input, a thumbnail candidate can be selected in accordance with a certain timing during the rendering of animation based on the thumbnail generation timing management file. Therefore, a thumbnail image desirable for the user can be generated also when animation is input.

In First Embodiment to Third Embodiment, when there is no thumbnail candidate list because no superimposition item has been superimposed, no representative thumbnail is registered. Alternatively, a frame extracted under other conditions, such as the first frame in a moving image, may be registered as a representative thumbnail.

Furthermore, in First Embodiment to Third Embodiment described above, single hardware may control the CPU 107, or the entire device may be controlled by a plurality of sets of hardware sharing processing.

Although the present invention has been described above in detail based on embodiments thereof, the present invention is by no means limited to these specific embodiments and includes various modifications without departing from the concept of the present invention. The above embodiments are merely illustrative embodiments of the present invention, and may be combined where appropriate.

Although the above embodiments have described the example in which the invention is applied to a digital video camera, the invention is not limited to this example. Alternatively, the invention may be applied to any device that has an image sensor and a function of taking a moving image, such as a mobile telephone, a smartphone and a PDA. Alternatively, the present invention may be applied to any device without a function of taking a moving image, as long as it has a moving image editing function and can superimpose superimposition items over a moving image while editing the moving image. Examples of such a device include a personal computer, a portable image viewer, a printer device provided with a display, a digital photo frame, a music player, a game console, and an electronic book reader.

Other Embodiments

Aspects of the present invention can also be realized by a computer of a system or apparatus (or devices such as a CPU or MPU) that reads out and executes a program recorded on a memory device to perform the functions of the above-described embodiment(s), and by a method, the steps of which are performed by a computer of a system or apparatus by, for example, reading out and executing a program recorded on a memory device to perform the functions of the above-described embodiment(s). For this purpose, the program is provided to the computer for example via a network or from a recording medium of various types serving as the memory device (e.g., computer-readable medium).

While the present invention has been described with reference to exemplary embodiments, it is to be understood that the invention is not limited to the disclosed exemplary embodiments. The scope of the following claims is to be accorded the broadest interpretation so as to encompass all such modifications and equivalent structures and functions.

This application claims the benefit of Japanese Patent Application No. 2012-028858, filed Feb. 13, 2012, which is hereby incorporated by reference herein in its entirety.

What is claimed is:

1. A moving image recording device comprising:
   an instruction unit configured to receive an instruction from a user to superimpose an item on a moving image during taking or playing back of the moving image;
   an item superimposition unit configured to superimpose the item over a portion of the moving image which is taken or played back after the reception of the instruction by the instruction unit; and
   a control unit configured to determine a representative image in the moving image and perform control to store information indicating the representative image in association with the moving image,
   wherein the control unit determines the representative image of the moving image based on a change in a superimposed state of the item superimposed over the taken or played back moving image so that an image over which the item has been superimposed is determined as the representative image.

2. The moving image recording device according to claim 1, wherein the control unit determines a frame being superimposed by the last item that has been superimposed over the moving image by the item superimposition unit as the representative image, and performs control to store information of the frame determined as the representative image.

3. The moving image recording device according to claim 1, wherein when a predetermined time period has elapsed without any change in the superimposed state of the item, the control unit determines a frame in the superimposed state without any change as the representative image and performs control to store information of the frame determined as the representative image.

4. The moving image recording device according to claim 1, wherein when all items that have been superimposed over the moving image by the item superimposition unit have been cleared, the control unit determines a frame that precedes the clearing of all the items as the representative image and performs control to store information of the frame determined as the representative image.

5. The moving image recording device according to claim 4, wherein the control unit determines a frame that immediately precedes the clearing of all the items as the representative image and performs control to store information of the frame determined as the representative image.

6. The moving image recording device according to claim 5, further comprising a reception unit configured to receive an instruction for clearing all the items superimposed over the moving image,
   wherein in response to the reception unit having received the instruction for clearing all the items, the control unit determines a frame before clearing all the items as the representative image and performs control to store information of the frame determined as the representative image, and then all the items are cleared.

7. The moving image recording device according to claim 1, wherein when an animation composed of a plurality of steps is superimposed over the moving image as the item, the control unit determines a frame in the moving image over which an animation corresponding to a predetermined step out of the plurality of steps has been superimposed as the representative image and performs control to store information of the frame determined as the representative image.

8. The moving image recording device according to claim 1, wherein the control unit performs control to store information of one image selected among a plurality of images determined as the representative image in association with the moving image, the plurality of images includes:
   a frame being superimposed by the last item that has been superimposed over the moving image by the item superimposition unit,
   when a predetermined time period has elapsed without any change in the superimposed state of the item, a frame in the superimposed state without any change,
   when all items that have been superimposed over the moving image by the item superimposition unit have been cleared, a frame that precedes or immediately precedes the clearing of all the items,
   when an instruction for clearing all the items has been received, a frame before clearing all the items, and
   when an animation composed of a plurality of steps is superimposed over the moving image as the item, a frame in the moving image over which an animation corresponding to a predetermined step out of the plurality of steps has been superimposed.

9. The moving image recording device according to claim 1, further comprising a touchscreen configured to receive a touch operation performed on a display unit configured to display a moving image being taken or played back,
   wherein the instruction unit receives an instruction to superimpose a hand-drawn object that follows a locus of a touch operation performed on the touchscreen over a moving image.

10. The moving image recording device according to claim 1, wherein the instruction unit receives an instruction to superimpose a stamp image having a predetermined shape over the moving image in accordance with an input from the user.

11. The moving image recording device according to claim 1, further comprising an image capturing unit configured to take a moving image,
   wherein in response to the instruction unit having received the instruction to superimpose the item over the moving image while the image capturing unit is taking the moving image, the item superimposition unit superimposes the item over the moving image being taken by the image capturing unit after the reception of the instruction by the instruction unit.

12. The moving image recording device according to claim 1, wherein when the item has not been superimposed over the moving image by the item superimposition unit, the control unit determines an image determined in accordance with a condition other than a change in the superimposed state of the item as the representative image and performs control to store information of a frame determined as the representative image.

13. The moving image recording device according to claim 1, wherein the control unit performs control to store information indicating a position of a frame of the representative image in the moving image, as the information indicating the representative image.

14. The moving image recording device according to claim 13, wherein the information indicating the representative image is a time code.

15. The moving image recording device according to claim 1, further comprising a storage control unit configured to cause a storage unit to store a moving image on which the item has been superimposed by the item superimposition unit.

16. The moving image recording device according to claim 1, wherein the control unit performs control to store a still image generated based on the frame in the moving image determined as the representative image as the information indicating the representative image.

17. The moving image recording device according to claim 1, wherein the instruction unit receives a plurality of instructions to superimpose an item on the moving image during taking or playing back of the moving image.

18. The moving image recording device according to claim 1, wherein the instruction unit further receives an instruction to change a type of the item to be superimposed over the moving image.

19. The moving image recording device according to claim 18, wherein the instruction unit receives the instruction to change the type of the item to be superimposed during taking or playing back of the moving image.

20. A control method for a moving image recording device comprising:
receiving an instruction from a user to superimpose an item on a moving image during taking or playing back of the moving image;
superimposing the item over portion of the moving image taken or played back after the reception of the instruction;
determining a representative image in the moving image; and
performing control to store information indicating the representative image in association with the moving image,
wherein the representative image of the moving image is determined based on a change in a superimposed state of the item superimposed over the taken or played back moving image so that an image over which the item has been superimposed is determined as the representative image.

21. A non-transitory computer readable storage medium storing a program for causing a computer to function as a moving image recording device comprising:
an instruction unit configured to receive an instruction from a user to superimpose an item on a moving image during taking or playing back of the moving image;
an item superimposition unit configured to superimpose the item over a portion of the moving image taken or played back after the reception of the instruction by the instruction unit; and
a control unit configured to determine a representative image in the moving image and perform control to store information indicating the representative image in association with the moving image,
wherein the control unit determines the representative image of the moving image based on a change in a superimposed state of the item superimposed over the taken or played back moving image so that an image over which the item has been superimposed is determined as the representative image.

* * * * *